US010615596B2

(12) United States Patent
Hannah et al.

(10) Patent No.: US 10,615,596 B2
(45) Date of Patent: Apr. 7, 2020

(54) SYSTEMS, METHODS AND APPARATUS FOR AN IMPROVED AGGREGATION ENGINE FOR A DEMAND RESPONSE MANAGEMENT SYSTEM

(71) Applicant: Siemens Aktiengesellschaft, München (DE)

(72) Inventors: Jason Hannah, New Brunswick (CA); Sachin Gupta, Waxhaw, NC (US); Monica McKenna, North Berwick, ME (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 93 days.

(21) Appl. No.: 14/871,159

(22) Filed: Sep. 30, 2015

(65) Prior Publication Data

US 2017/0093155 A1 Mar. 30, 2017

(51) Int. Cl.
*H02J 3/00* (2006.01)
*G06Q 50/06* (2012.01)
(Continued)

(52) U.S. Cl.
CPC ............... *H02J 3/00* (2013.01); *G05B 15/02* (2013.01); *G06Q 50/06* (2013.01); *H02J 3/14* (2013.01);
(Continued)

(58) Field of Classification Search
CPC . G05B 15/02; G06Q 50/06; H02J 3/00; H02J 3/14; H02J 2003/143; Y04S 10/54
See application file for complete search history.

(56) References Cited

U.S. PATENT DOCUMENTS 8,260,468 B2 9/2012 Ippolito
8,676,953 B2 3/2014 Koch
(Continued)

FOREIGN PATENT DOCUMENTS

EP 2821955 A1 1/2015
JP 2008537818 A 9/2008
(Continued)

OTHER PUBLICATIONS

European Search Report dated Nov. 17, 2016 corresponding to European Application No. 16191084.9 filed Sep. 28, 2016 (67 pages).

(Continued)

*Primary Examiner* — Jennifer L Norton

(57) ABSTRACT

Embodiments provide systems, methods and apparatus for effecting a demand response (DR) event by providing a demand response management system (DRMS) communicatively coupled to a plurality of participant sites, the DRMS including an aggregation engine having a rules-based function operative to generate an aggregation of the participant sites for a DR event using inclusion criteria that includes a custom field, wherein business objects (BOs) are used to represent the participant sites and other related entities (e.g., participants, enrollments, service delivery points (SDPs), etc.) and the BOs store core characteristics of the participant sites and the other related entities in core fields, and wherein the custom field is associated with a BO but the definition and content of the custom field is stored external to the associated BO; generating the aggregation using the inclusion criteria; and executing the DR event on the aggregation. Numerous other aspects are provided.

17 Claims, 7 Drawing Sheets

(51) Int. Cl.
*G05B 15/02* (2006.01)
*H02J 3/14* (2006.01)

(52) U.S. Cl.
CPC .......... *H02J 2003/143* (2013.01); *Y04S 10/54* (2013.01)

(56) References Cited

U.S. PATENT DOCUMENTS

| | | | | |
|---|---|---|---|---|
| 9,310,786 | B2* | 4/2016 | Imhof | G05B 15/02 |
| 2004/0024483 | A1* | 2/2004 | Holcombe | G06Q 30/02 |
| | | | | 700/122 |
| 2011/0125542 | A1 | 5/2011 | Koch | |
| 2011/0258018 | A1* | 10/2011 | Tyagi | G06Q 30/02 |
| | | | | 705/7.33 |
| 2012/0066686 | A1* | 3/2012 | Koch | G06Q 10/06 |
| | | | | 718/104 |
| 2012/0143952 | A1* | 6/2012 | von Graf | G06Q 50/01 |
| | | | | 709/204 |
| 2012/0245749 | A1* | 9/2012 | Littrell | H02J 3/14 |
| | | | | 700/291 |
| 2012/0310431 | A1 | 12/2012 | Cheetham | |
| 2013/0110305 | A1* | 5/2013 | Meyerhofer | G06Q 50/06 |
| | | | | 700/296 |
| 2013/0110569 | A1* | 5/2013 | Meyerhofer | G06Q 10/10 |
| | | | | 705/7.16 |
| 2014/0062195 | A1* | 3/2014 | Bruschi | B60L 11/1842 |
| | | | | 307/38 |
| 2014/0343983 | A1 | 11/2014 | Bahl | |
| 2015/0081570 | A1* | 3/2015 | Gedela | G06Q 30/0281 |
| | | | | 705/304 |
| 2015/0134280 | A1 | 5/2015 | Bahl | |
| 2015/0148977 | A1* | 5/2015 | Nakayama | G05B 15/02 |
| | | | | 700/291 |
| 2015/0206083 | A1* | 7/2015 | Chen | G06Q 10/06313 |
| | | | | 705/7.23 |
| 2017/0104330 | A1* | 4/2017 | Nakaishi | H02J 3/14 |

FOREIGN PATENT DOCUMENTS

| | | |
|---|---|---|
| JP | 2010172159 A | 8/2010 |
| JP | 2012517791 A | 8/2012 |
| JP | 2013230051 A | 11/2013 |
| JP | 2014060879 A | 4/2014 |
| JP | 2015014876 A | 1/2015 |
| JP | 2015022560 A | 2/2015 |
| JP | 2015033199 A | 2/2015 |
| WO | 2013055551 A1 | 4/2013 |
| WO | 2014002494 A1 | 1/2014 |

OTHER PUBLICATIONS

Anonymous: "UserDefinedField", Sep. 7, 2015 (Sep. 7, 2015), XP055455077, Retrieved from the Internet: URL:https://web.archive.org/web/20150907012736/https://martinfowler.com/bliki/UserDefinedField.html [retrieved on Feb. 28, 2018].

Anonymous: "Object—relational mapping—Wikipedia", Sep. 29, 2015 (Sep. 29, 2015), XP055455070, Retrieved from the Internet: URL:https://en.wikipedia.org/w/index.php?title=Object-relational_mapping&oldid=683325631 [retrieved on Feb. 28, 2018].

Anonymous: "Object-oriented programming—Wikipedia", Sep. 25, 2015 (Sep. 25, 2015), XP055455673, Retrieved from the Internet: U RL: https://en.wiki pedia.org/w/i ndex. ph p?title=Object-oriented_prog ram m i ng&oldid=682770259 [retrieved on Feb. 28, 2018].

\* cited by examiner

SYSTEMS, METHODS AND APPARATUS FOR AN IMPROVED AGGREGATION ENGINE FOR A DEMAND RESPONSE MANAGEMENT SYSTEM

FIELD

The present invention relates to operating energy delivery systems, and more specifically to an improved aggregation engine for a demand response management system.

BACKGROUND

An energy management system (EMS) is a system of computer implemented tools used by operators of electric utility grids to monitor, control, and optimize the performance of the generation and/or transmission of an energy delivery system. In other words, an EMS is used to optimize, supervise and control the transmission grid, generation assets, and in some cases, the loads. The monitoring and control functions are known as "supervisory control and data acquisition" (SCADA). Control of such a system can involve autonomous automatic control actions by the EMS to arrest deviations in power system frequency whenever imbalances arise between load and generation.

One tool that utilities have to help more cost-effectively control load is called Demand Response (DR). According to the Federal Energy Regulatory Commission, DR is defined as changes in electric usage by end-use customers from their normal consumption patterns in response to changes in the price of electricity over time, or to incentive payments designed to induce lower electricity use at times of high wholesale market prices or when system reliability is jeopardized, DR includes all intentional modifications to consumption patterns of electricity to induce customers that are intended to alter the timing, level of instantaneous demand, or the total electricity consumption. DR programs are designed to decrease electricity consumption or shift it from on-peak to off-peak, periods depending on consumers' preferences and lifestyles. Demand response activities are defined as "actions voluntarily taken by a consumer to adjust the amount or timing of his energy consumption". Actions are generally in response to an economic signal (e.g., energy price, or government and/or utility incentive). Demand response is a reduction in demand designed to reduce peak demand or avoid system emergencies. Hence, demand response can be a more cost-effective alternative than adding generation capabilities to meet the peak and/or occasional demand spikes. The underlying objective of DR is to actively engage customers in modifying their consumption in response to pricing signals. The goal is to reflect supply expectations through consumer price signals or controls and enable dynamic changes in consumption relative to price.

In electricity grids, DR is similar to dynamic demand mechanisms to manage customer consumption of electricity in response to supply conditions, for example, having electricity customers reduce their consumption at critical times or in response to market prices. The difference is that demand response mechanisms respond to explicit requests to shut-off, whereas dynamic demand devices passively shut off when stress in the grid is sensed. Demand response can involve actually curtailing power used or by starting on-site generation which may or may not be connected in parallel with the grid. This is a quite different concept from energy efficiency, which means using less power to perform the same tasks, on a continuous basis or whenever that task is performed. At the same time, demand response is a component of smart energy demand, which also includes energy efficiency, home and building energy management, distributed renewable resources, and electric vehicle charging.

Current demand response management systems (DRMS) are implemented with large and small industrial and commercial as well as residential customers, often through the use of dedicated control systems to shed loads in response to a request by a utility or market price conditions. For example, services (e.g., lights, machines, air conditioning, water heaters) are reduced according to a preplanned load prioritization scheme during a planned time frame. An alternative to load shedding is on-site generation of electricity to supplement the power grid. Under conditions of tight electricity supply, DR can significantly decrease the peak price and, in general, electricity price volatility.

A DRMS provides functionality for the operation and settlement of DR programs. A user is able to schedule the distribution of DR events using a DRMS interface when a DR program is needed (i.e., the DR program is "called"). In some embodiments, an event can additionally be automatically triggered (e.g., programmatically) based on specified conditions, not requiring any interaction with a user interface. The DRMS sends DR event signals to controllable end devices, such as water heaters, thermostats, and switches through an Advanced Metering Infrastructure (AMI), RCS, or a DR gateway (e.g., such as an OpenADR device) installed at the participant's site. The DRMS calculates the settlement data, which is the basis for the DR incentive payment to the participant used for billing. Settlement occurs after the DR event when meter data is available in the Meter Data Management (MDM) system.

Managing the myriad of continually changing participant loads that can be shed or consumed/shifted during a DR event presents a challenging administrative problem with substantial overhead. Thus, there is a significant need to provide systems, methods and apparatus for improved aggregation of participant sites in a demand response management system.

SUMMARY

In some embodiments, a method of effecting a demand response (DR) event is provided. The method includes providing a demand response management system (DRMS) communicatively coupled to a plurality of participant sites, the DRMS including an aggregation engine having a rules-based function operative to generate an aggregation of the participant sites for a DR event using inclusion criteria that includes a custom field, wherein business objects are used to represent the participant sites and other related entities (e.g., participants, enrollments, service delivery points (SDPs), etc.) and the business objects store core characteristics of the participant sites and the other related entities in a plurality of core fields, and wherein the custom field is associated with a business object but the definition and content of the custom field is stored external to the associated business object; generating the aggregation of participant sites for the DR event using the inclusion criteria that includes the custom field; and executing the DR event on the aggregation of participant sites.

In other embodiments, a system is provided. The system includes a process controller; a memory coupled to the process controller and storing instructions executable on the process controller to cause the process controller to: generate an aggregation of participant sites for a demand response (DR) event using an aggregation engine having a first rules-based function operative to generate aggregations of participant sites using one or more inclusion criteria that includes a custom field, wherein business objects are used to represent the participant sites and other related entities (e.g., participants, enrollments, service delivery points (SDPs), etc.) and the business objects store core characteristics of the participant sites and the other related entities in a plurality of core fields, and wherein the custom field is associated with a business object but the definition and content of the custom field is stored external to the associated business object; and execute the DR event on the aggregation of participant sites to shed or shift load.

In still other embodiments, a computer implemented demand response management system (DRMS) is provided. The DRMS includes an aggregation engine having a first rules-based function operative to generate an aggregation of participant sites for a demand response (DR) event using inclusion criteria that includes a custom field, wherein business objects are used to represent the participant sites and other related entities (e.g., participants, enrollments, service delivery points (SDPs), etc.) and the business objects store core characteristics of the participant sites and the other related entities in a plurality of core fields, and wherein the custom field is associated with a business object but the definition and content of the custom field is stored external to the associated business object; an event management module (EMM) operative to receive the aggregation of participant sites from the aggregation engine and to execute the DR event on the aggregation of participant sites by sending a control signal to the participant sites that are included in the aggregation.

Numerous other aspects are provided in accordance with these and other aspects of the invention. Other features and aspects of the present invention will become more fully apparent from the following detailed description, the appended claims and the accompanying drawings.

DESCRIPTION

Figure 1:
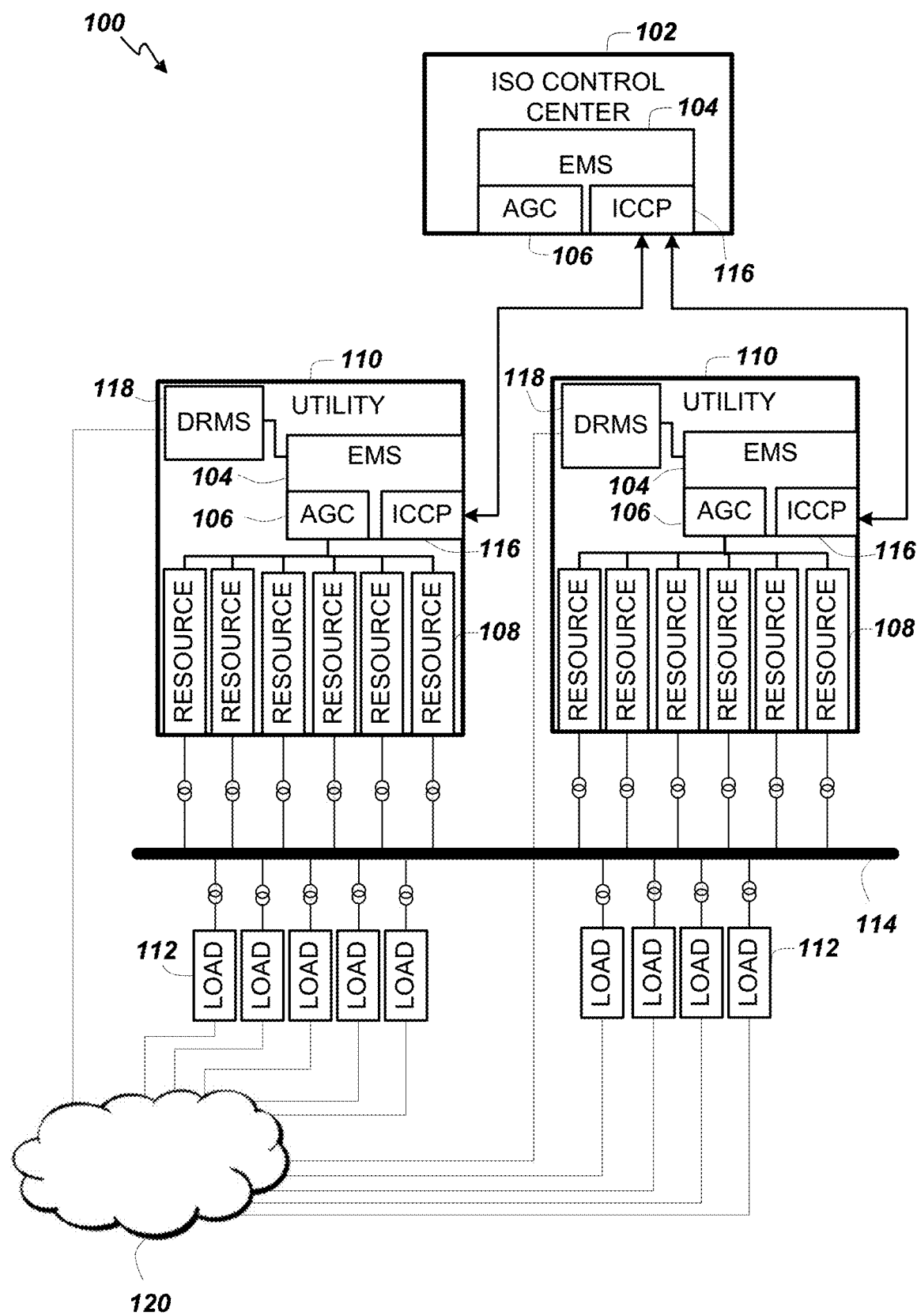
FIG. 1 is a block diagram depicting physical components of a portion of an example power distribution system according to embodiments of the present invention.

Embodiments of the present invention provide systems, apparatus and methods for an improved extensible aggregation engine for a demand response management system (DRMS). The improved aggregation engine is extensible in the sense that additional, "custom" parameters used to describe and select DR event participant sites can be added for use in the engine (e.g., by a user) without requiring changes to the data model. By using these custom parameters with a rules based query, a group of participant sites for a DR event, selected to meet the goals (e.g., business goals) of the DR event, can be timely aggregated for participation, instead of having to rely upon an aging, static participant list or having to rely on a static list of core attributes to use for aggregation, both of which require continual maintenance to insure they are up to date. In other words, while a conventional database can be used to store premade groups of participant sites for different DR events, the participant sites change over time and maintaining a large number of such groups can result in substantial overhead and the need to continually distribute updates of the data model. Embodiments of the present invention avoid these drawbacks by dynamically assembling a list of participant sites on demand and do so using a DRMS architecture that does not require the custom parameters to be stored in the data models of the participant sites.

Within a DRMS according to embodiments of the present invention, when a DR event is executed, commands are dispatched to many different participant sites. To facilitate this functionality, participant sites are aggregated together in a logical grouping so the aggregation itself can be specified as part of the event. These logical groupings of participant sites can be pre-selected and stored as a static aggregation or they can be determined dynamically by a rule-based aggregation engine. Dynamic rule-based aggregations offer substantial flexibility as the rules can be defined to match the business case being fulfilled. Rule-based aggregations also require substantially less administrative overhead since the aggregation itself is not being administered, but rather only the rules supporting the aggregation are administered.

As mentioned above, the applicability of the rule-based aggregation engine is extended even further by embodiments of the present invention via the use of custom fields or parameters. Custom fields are typed extensions to a primary class entity within the DRMS data model. This allows a utility to deploy a particular version of the DRMS, regardless of what information they would like to store within the data model. At deployment time, custom fields can be added and linked to a primary class entity, allowing the utility to persist whatever information they prefer, without having to redeploy or update the DRMS data model. With one or more custom fields in place, the aggregation engine can be configured to execute a rule against the custom fields to select participant sites to be aggregated based on the content of the custom fields.

The following example is provided to illustrate how the extensible aggregation engine of embodiments of the present invention can leverage custom fields in a rules-based aggregation. Assume that a DRMS data structure includes a data table that describes characteristics of participant sites. However, assume the Participant Site table does not include a field to track, for example, a residence's architectural specification. If a utility determines it would like this information tracked so that it can be a basis of selection for a DR event, a custom field can be created called, for example, "House Type" and the new House Type field can be linked to the Participant Site table. With this link in place, the House Type field can be populated for any residence description stored in the system, possibly for example, with a selection of values such as "Bungalow", "Split-level" or "Two story". For the next DR event, the utility can now configure a rule within the aggregation engine such that any participant site with a House Type equal to Bungalow will be selected.

Additionally, the utility can combine rules such that any participant site with a House Type equal to Bungalow and postal zip code starting with "105" are selected for inclusion in an aggregation. Such a compound rule allows the utility to execute a DR event targeting specific locations, geographically and based on some tracked physical characteristic. Likewise the compound rule can be a union of either geographic location or physical characteristic.

Turning now to FIG. 1, a portion of an example energy delivery system 100 according to embodiments of the present invention is provided. Independent System Operators (ISO) 102 operate control centers that can include an Energy Management System (EMS) 104. The EMS 104 can include a number of hardware and software components for monitoring, controlling, and optimizing the performance (e.g., in terms of minimizing cost, maximizing efficiency, and maximizing reliability) of the generation and transmission of the energy delivery system 100.

The EMS 104 includes an automatic generation control (AGC) system 106 for adjusting the power output of multiple resources 108 (e.g., generators) at different power plants (e.g., utilities 110, independent power producers (IPP) and/or non-utility generators (NUG), etc.), in response to changes in the load created by consumers of the electricity. The generated power is delivered from the resources 108 to power consumers' loads 112 via transmission lines 114. Note that the utilities 110 can include an EMS 104 with an AGC system 106. To facilitate communications and control between the EMSs 104, the EMSs 104 also implement an inter-control center protocol (ICCP) 116.

A DRMS 118 operated by the utilities 110, optionally in conjunction with (and communicatively coupled to) the EMS 104, provides users with the ability to use demand side management (DSM) methods such as DR events to, e.g., shed or shift load 112 as needed. Embodiments of the present invention in the form of an improved DRMS 118 can be integrated (e.g., using an application programming interface (API)) with existing commercially available EMS products such as the Spectrum Power 7™ and the Spectrum Power TG™ Energy Management Systems manufactured by Siemens Industry, Inc. of Washington, D.C. Note that although only a utility-based DRMS 118 is shown in FIG. 1, a DRMS can be installed and used at an ISO as well as at a downstream aggregator.

Since a power grid requires that generation and load closely balance moment by moment, frequent adjustments to the output of resources 108 are continuously made. The balance can be judged by measuring the system frequency; if system frequency is increasing, more power is being generated than used, and the generators in the system 100 are accelerating. If the system frequency is decreasing, more load is on the system 100 than the instantaneous generation can provide, and the generators in the system 100 are slowing down.

Where the grid has tie interconnections to adjacent control areas, the AGC system 106 helps maintain the power interchanges over the tie lines at the scheduled levels. With computer-based control systems and multiple inputs, an AGC system 106 can take into account such matters as the most economical units to adjust, the coordination of thermal, hydroelectric, wind, and other generation types, and constraints related to the stability of the system and capacity of interconnections to other power grids. Via the HMI application, operators not only program the AGC but also monitor and oversee its operations and intervene when necessary.

Within the EMS 104, the AGC system 106 can be implemented within a Process Controller (PC) server that also includes Communicator (COM) functionality. The AGC system 106 can include a Load Frequency Control (LFC) module and an Economic Dispatch (ED) module. The EMS 104 can include redundant back-up servers to provide higher reliability and fault-tolerance. Thus, a Standby (SB) server with COM functionality is also provided in some embodiments. A PC server that implements a Historical Information System (HIS) and a SB server that implements a backup HIS can be included in the EMS 104 as well.

The EMS 104 further includes one or more Utility Communication Servers that each provide an implementation of an Inter-Control Center Communication Protocol (ICCP) 116 that enables communication with, for example, other EMSs in operation at, for example, several utilities 110. In some embodiments, ICCP 116 can be used to implement remote control of resources 108 by implementing AGC system 106 communications between different EMSs. The EMS 104 also includes a communication front end (CFE)/Real Time Data Server (RTDS) to facilitate communications with external entities and users via remote terminal units (RTUs). Note that RTUs are part of the power utilities' field devices, for example. In some embodiments, the EMS 104 can also include a number of additional servers and applications. For example, the EMS 104 can include Operator Training Simulator (OTS) servers, a PC Administration (ADM) application server, a SB ADM application server, a PC Transmission Network Application (TNA), and a SB TNA.

In operation of the energy delivery system, the ISO clears the real time market through its market optimization engine and then ISOs dispatch instructions along with ancillary service awards (e.g., regulation, reserves, etc.) to individual power utilities through a transport mechanism (e.g., ICCP 116). The power utilities receive the dispatch instructions (e.g., via ICCP 116) and then make use of their AGC system 106 to compute a power setpoint command for each AGC cycle for the resources under AGC control (i.e., AGC units). Next, the setpoints are updated to SCADA and they are then sent to the utilities' RTUs via the CFE/RTDS. There are dedicated RTU lines that connect the RTUs to the CFE/RTDS via, e.g., modems. RTUs can be geographically located in the utilities' substations and hardwired to the resources (e.g., generators). The various applications such as, for example, AGC system 106, SCADA, CFE/RTDS, and ICCP 116 are part of EMS 104. The RTUs are field devices that are capable of sending telemetry to the ISO EMS 104 and can also receive megawatt (MW) setpoints from the ISO EMS 104 to control resources (e.g., generators).

In some embodiments, the hardware and operating environment for the DRMS 118 includes a general purpose computing device in the form of a computer (e.g., a personal computer, laptop, tablet, smartphone, workstation, server, or other processor-based device), including one or more processing units, a system memory, and a system bus that operatively couples various system components including the system memory to the processing unit. There may be one or more processing units, such that the processor of the computer comprises a single central-processing unit (CPU), or a plurality of processing units, commonly referred to as a multiprocessor or parallel-processor environment. A multiprocessor system can include cloud computing environments. In various embodiments, the computer is a conventional computer, a distributed computer, or any other type of computer.

The system bus can be any of several types of bus structures including a memory bus or memory controller, a peripheral bus, and a local bus using any of a variety of bus architectures. The system memory can also be referred to as simply the memory, and, in some embodiments, includes read-only memory (ROM) and random-access memory (RAM). A basic input/output system (BIOS) program, containing the basic routines that help to transfer information between elements within the computer, such as during start-up, may be stored in ROM. The computer can further include a hard disk drive for reading from and writing to a hard disk, a solid state drive (SSD) for reading from or writing to electronic non-volatile storage, and an optical disk drive for reading from or writing to a removable optical disk such as a DVD ROM or other optical media.

The hard disk drive, SSD, and optical disk drive couple with a hard drive interface, a SSD interface, and an optical disk drive interface, respectively. The drives and their associated computer-readable media provide non-volatile storage of computer-readable instructions, data structures, program modules and other data for the computer. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, SSD, optical disk, ROM, or RAM, including an operating system, one or more application programs, other program modules, and program data. A plug in containing a security transmission engine for embodiments of the present invention can be resident on any one or number of these computer-readable media.

A user may enter commands and information into the computer through input devices such as a keyboard and pointing device, a touch screen, and/or a gesture sensor. Other input devices can include a microphone, joystick, game pad, scanner, or the like. These other input devices are often connected to the processing unit through a serial port interface that is coupled to the system bus, but can be connected by other interfaces, such as a parallel port, game port, or a universal serial bus (USB). A monitor or other type of display device can also be connected to the system bus via an interface, such as a video adapter. The monitor can display a graphical user interface including color and animation for the user. In addition to the monitor, the computer can include other peripheral output devices, such as audio speakers and printers.

The DRMS 118 computer may operate in a networked environment using logical connections to one or more remote computers or servers, such as a remote computer or controller coupled to and operative to control one or more loads 112 in response to signals from the DRMS 118 computer. These logical connections are achieved by a wired or wireless communication device coupled to or a part of the computer; embodiments of the invention are not limited to a particular type of communications device. The remote computer can be another computer, a server, a router, a network PC, a client, a peer device or other common network node, and can include many or all of the elements described above relative to the computer. The logical connections can include a local area network (LAN) and/or a wide area network (WAN) 120. Such networking environments can exist in office networks, enterprise-wide computer networks, intranets and the Internet, which are all types of networks.

When used in a LAN-networking environment, the computer is connected to the LAN through a wired or wireless network interface or adapter, which is one type of communications device. In some embodiments, e.g., when used in a WAN-networking environment, the computer can include a modem (another type of communications device) or any other type of communications device, e.g., a wireless transceiver, for establishing communications over the WAN 120, such as the Internet or a private, dedicated and secure network. The modem, which can be internal or external, can be connected to the system bus via the serial port interface. In a networked environment, program modules depicted relative to the computer can be stored in the remote memory storage device of a remote computer, or server. It is appreciated that the network connections described are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Figure 2:
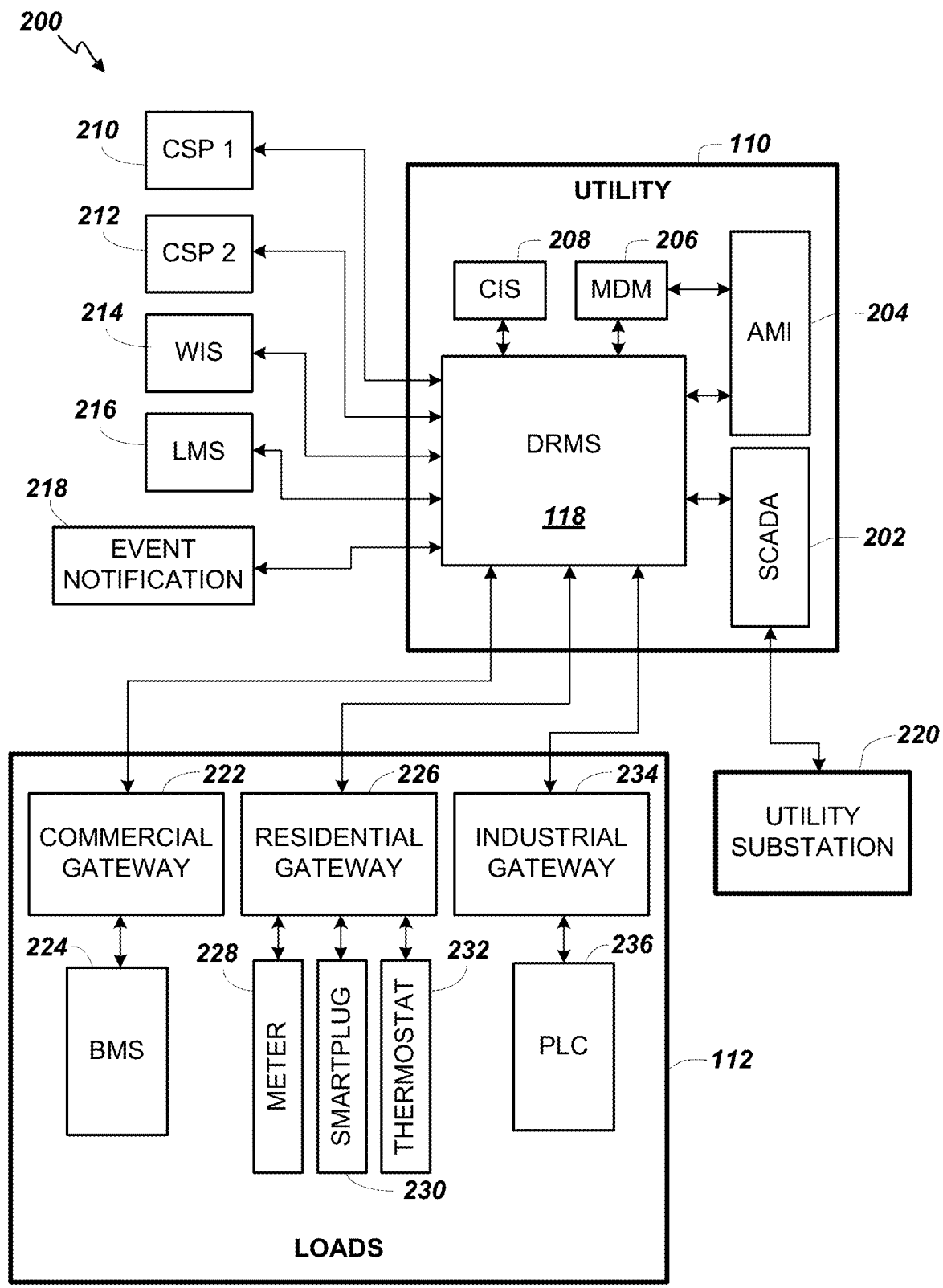
FIG. 2 is a block diagram depicting information technology infrastructure components of part of the power distribution system of FIG. 1 that supports a demand response management system (DRMS) according to embodiments of the present invention.

Turning now to FIG. 2, an example of an information technology infrastructure architecture 200 that supports operation of a DRMS 118 is shown. As mentioned above, the utility 110 can include a DRMS 118. Within the utility 110, the DRMS 118 can be communicatively coupled via a bi-directional communication link to each of a SCADA system 202, an Advanced Metering Infrastructure (AMI) system 204, a Meter Data Management (MDM) system 206, and a Customer Information System (CIS) 208. The AMI system 204 and the MDM system 206 can be directly communicatively coupled via a bi-directional communications link. The DRMS 118 has an interface to the MDM system 206 for retrieving meter data and an interface to the CIS 208 for retrieving asset data. The DRMS 118 sends the settlement data for billing to the MDM system 206 for the billing system to access. The DRMS 118 has an interface to the AMI system 204 to send DR Events. A DR Event contains information about the DR Program, start time, duration, and aggregation. The DRMS 118 sends commands to the AMI system 204, and the AMI system 204 can send commands to specific end devices. The AMI system 204 also collects meter data. The meter data is stored in the MDM system 206.

The DRMS 118 can be communicatively coupled via a bi-directional communication link to each of one or more curtailment service providers (CSPs) 210, 212, a weather information system (WIS) 214, a legacy load management system (LMS) 216, and an event notification system 218, each located external to the utility 110. The CSPs 210, 212 can be third party aggregators or retailers that are downstream from the utility 110. The SCADA system 202 can be communicatively coupled via a bi-directional communication link to one or more utility substations 220.

The DRMS 118 is communicatively coupled to various types of loads 112 via bi-directional communication links to respective DR gateways. The DRMS 118 can include an interface to DR gateways installed at participant sites that accept commands for DR events. The DR gateways communicate with end devices at the participant sites to manage DR events and collect meter data for visualizing the participant load data through a DRMS user interface. The DRMS 118 can communicate through a commercial gateway 222 to receive information from and to send control signals (e.g., a shutdown or restart signal) to building management systems (BMS) 224. The DRMS 118 can communicate through a residential gateway 226 to receive information from and to send control signals (e.g., a shutdown or restart signal) to an electric meter 228, smartplugs 230, and thermostats 232. The DRMS 118 can communicate through an industrial gateway 234 to receive information from and to send control signals (e.g., a shutdown or restart signal) to programmable logic controllers (PLCs) 236 in, for example, circuit breaker enclosures and/or industrial machinery.

Figure 3:
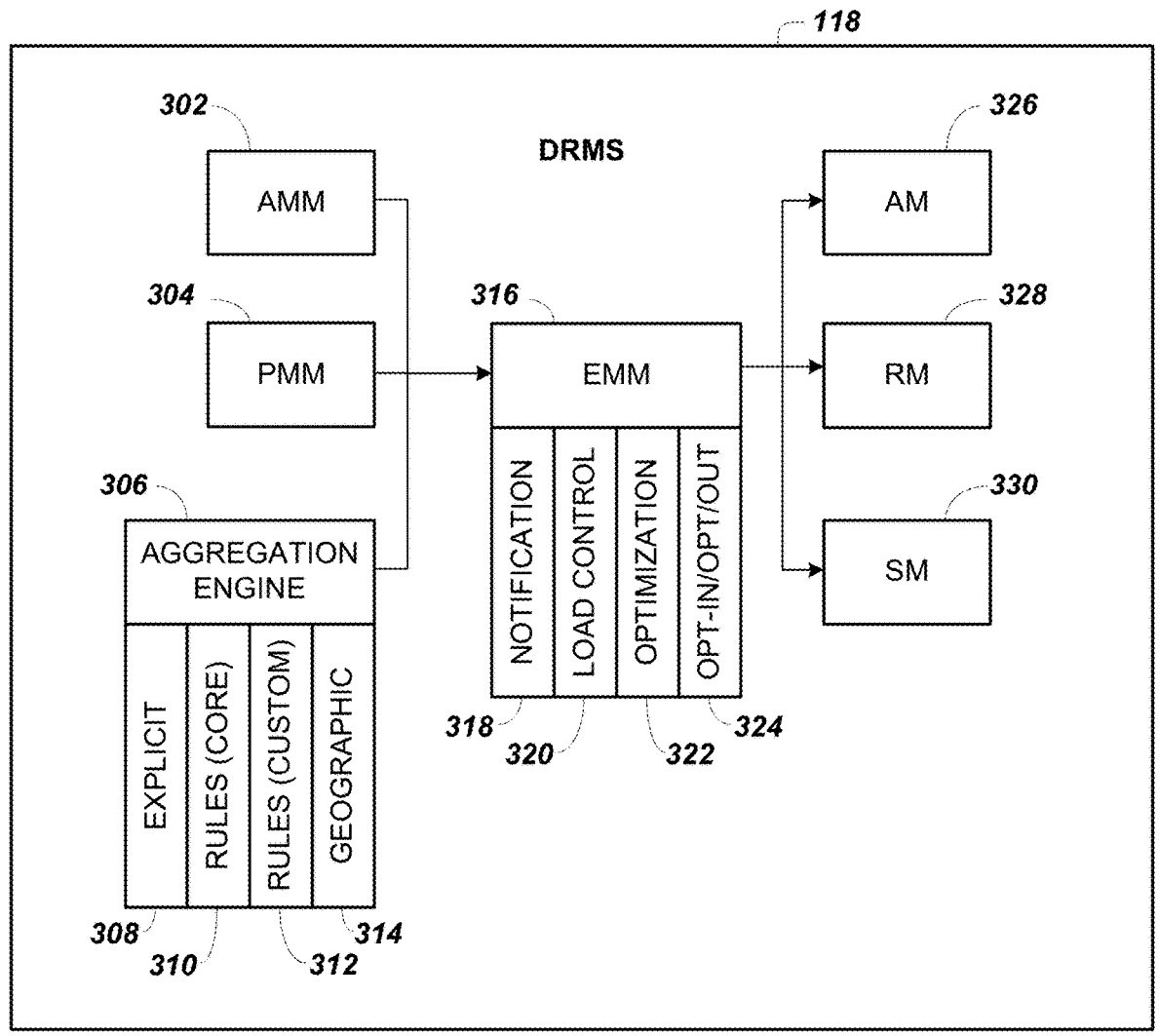
FIG. 3 is a simplified block diagram of the structure and dataflow of an example DRMS according to embodiments of the present invention.

FIG. 3 is a simplified block diagram of the structure and dataflow of an example DRMS 118 according to embodiments of the present invention. The particular example DRMS 118 pictured includes an asset management module (AMM) 302, a program management module (PMM) 304 and an aggregation engine 306. The aggregation engine 306 includes various aggregation functions for assembling a participant sites list.

The aggregation functions can include an explicit function 308 that simply allows the user to explicitly name each participant individually, e.g., via an imported list. The aggregation functions can include a rules-based (core field) function 310 that allows rules to dynamically define the participant sites list selected based on core fields that are predefined in the Participant Site and other related business objects' tables of the DRMS data model. The aggregation functions can include a rules-based (custom field) function 312 that allows rules to dynamically define the participant sites list selected based on custom fields that are typed extensions to the Participant Site table and other related business objects' tables of the DRMS data model. The aggregation functions can include a geographic function 314 that allows rules to dynamically define the participant sites list selected based on locations that are stored in the Participant Site table of the DRMS data model. Note that the aggregation engine 306 can combine any union or intersection of the output of the aggregation functions to assemble a participant sites list. The output of the AMM 302, the PMM 304, and the aggregation engine 306, including the participant sites list, is provided to the event management module (EMM) 316.

The EMM 316 includes several functions for effecting a DR event. A notification function 318 is used to communicate advanced notice to the aggregated participant sites (e.g., four hours beforehand). The content, timing and distribution of the notice are based on the output of the AMM 302, the PMM 304, and the aggregation engine 306. The EMM 316 includes a load control function 320 that is used to transmit the control signals (e.g., a shutdown signal and a restart signal) to the participating sites at the specified times. The EMM 316 also includes an optimization function 322 operative to maximize the benefit and minimize the cost of the event dispatch and load shedding so that the reduction is commensurate with the need, and happens in the same part of the electrical grid where, for example, the critical load situations are present. The EMM 316 includes an opt-in/opt-out function 324 operative, for example, to allow individual sites to choose to not participate in a DR event if the particular DR event program allows optional participation. Data collected during the DR event is output by the EMM 316 to an analytics module (AM) 326, a reporting module (RM) 328, and a settlement module (SM) 330.

Figure 4:
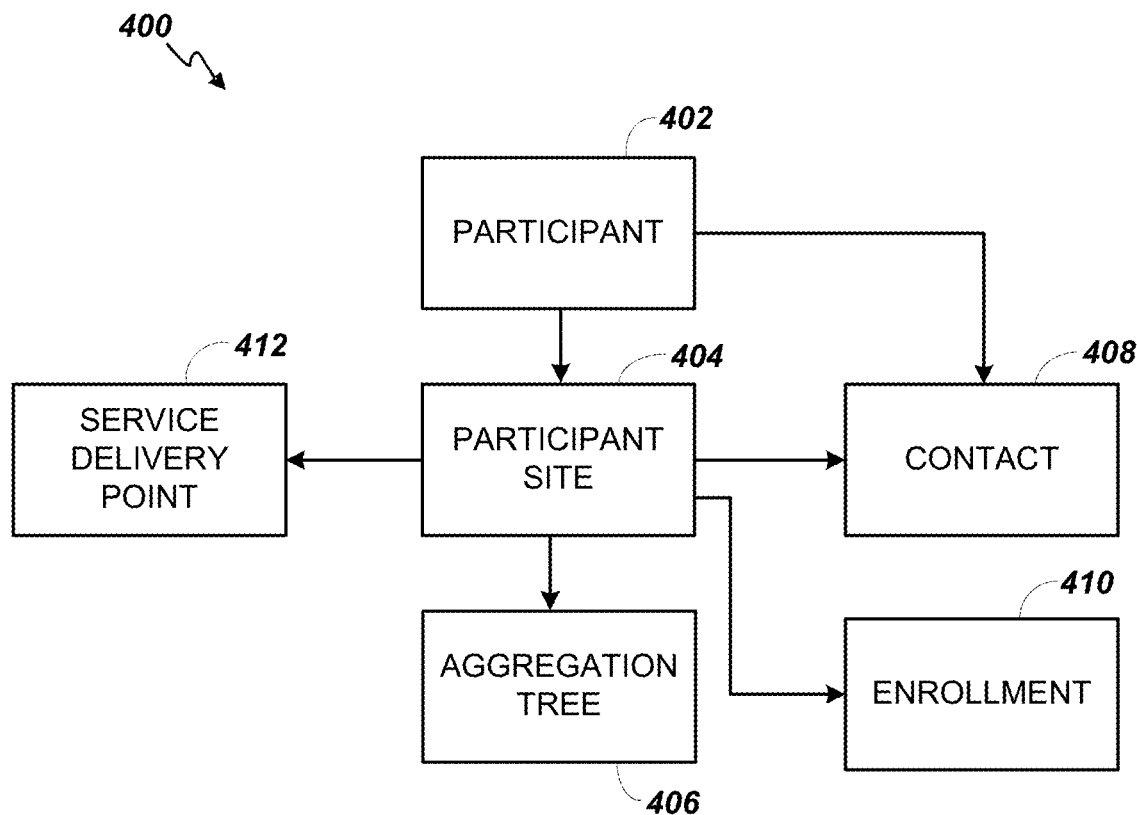
FIG. 4 is a simplified block diagram of an example data model for a DRMS according to embodiments of the present invention.

Turning now to FIG. 4, a block diagram of a simplified example embodiment of data model 400 for a DRMS 118 is shown. A participant 402 is associated with one or more participant sites 404. Each participant site 404 can be part of one or more aggregation trees 406. Each participant 402 and each participant site 404 has one or more contacts 408. Each participant site has one or contract enrollments 410 based on a DR program and one or more service delivery points (SDPs) 412. Each SDP 412 has one or more loads to be controlled and captures meter data. Each DR event is called using an aggregation tree 406.

Figure 5:
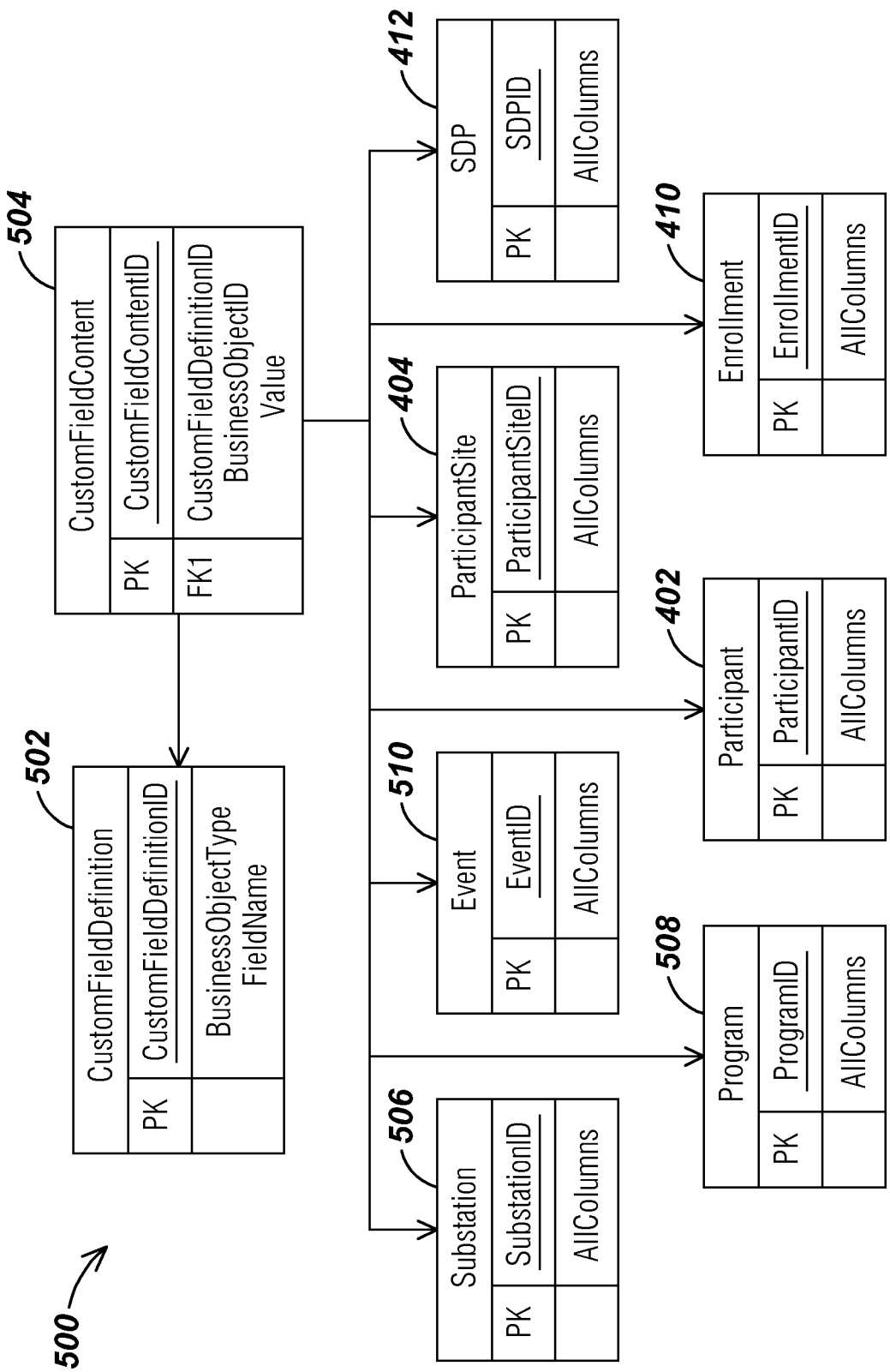
FIG. 5 is an example entity relationship diagram that depicts a data structure for a DRMS according to embodiments of the present invention.

FIG. 5 is an example entity relationship diagram 500 that depicts a data structure for the custom field implementation within the DRMS 118. Custom fields can be applied to several primary entities within a DRMS 118. The following business objects for primary entities can have custom fields applied to them: participant sites 404, substations 506, DR programs 508, enrollments 410, participants 402, SDPs 412, and DR events 510.

Each custom field entered into the DRMS 118 is provided within a name that will uniquely identify that field. Additionally, the custom field can be flagged as a required field, the custom field can be provided with a regular expression to validate content against, and the custom field can be provided with a series of acceptable values that can be provided as content.

The user interface within the DRMS 118 can support the addition of new custom fields. When a new custom field is associated with a primary entity, the create and edit screens associated with that entity are dynamically modified such that the new fields will be presented to the user. From the perspective of the end user, these new custom fields appear as though they are part of the primary entity's data model. However, the custom fields are actually persisted within their own table, regardless of their associated primary entity.

As can be seen from the entity relationship diagram 500 in FIG. 5, there is a foreign key from the CustomFieldContent table 504 to the CustomFieldDefinition table 502. There is also a relationship from the CustomFieldContent 504 table to all the other tables, however, it is not a true foreign key. This is because the BusinessObjectID field will reference an ID from one of several different tables. Which table is referenced is based on the content of the BusinessObjectType field within the associated record of the CustomFieldDefinition table 502. This arrangement allows for the logical extension of the data structure without having to modify the physical structure, which would require an upgrade of any deployed instance. This approach facilitates the customization of a deployment such that any information required to be persisted on the primary entities can be accommodated without having to explicitly declare that data point within a core table.

As discussed above, the aggregation engine 306 within the DRMS 118 is the system which drives the construction of participant site groups, sometimes referred to as aggregations. The user has the option of creating a static aggregation by selecting participant sites or other aggregations to add into a new aggregation or the user can construct a dynamic aggregation by specifying rules which dictate the criteria a participant site needs to meet in order to be included in the dynamic aggregation. These dynamic, or rule-based, aggregations can leverage geospatial rules to match participant sites existing within a specific geographic area and/or they can be based off attributes of various primary entities which are associated with the participant site. These attributes can be either core attributes as defined in the DRMS 118 or they can be custom fields on a primary entity, as defined within the custom field configuration of the DRMS instance. These rules can be combined in a variety of ways to create aggregations that contain only participant sites matching any number of criteria. At any time the aggregation engine 306 can execute the rules to regenerate the dynamic aggregation and if a new participant site matching all the aggregation criteria has been added to the DRMS since the last regeneration, the dynamic aggregation will automatically include the new participant site.

Of the primary entities that exist within the DRMS 118 that support custom fields, only a subset are used by the aggregation engine 306 as the content specified within a custom field is attributable to a participant site to enable the inclusion of that participant site within an aggregation. The following are examples of business objects related to participant sites that can have their custom fields applied within a dynamic aggregation rule: participant sites 404, DR programs 508, enrollments 410, substations 506, participants 402 and SDPs 412. Many additional or alternative business objects can be implemented.

Figure 6:
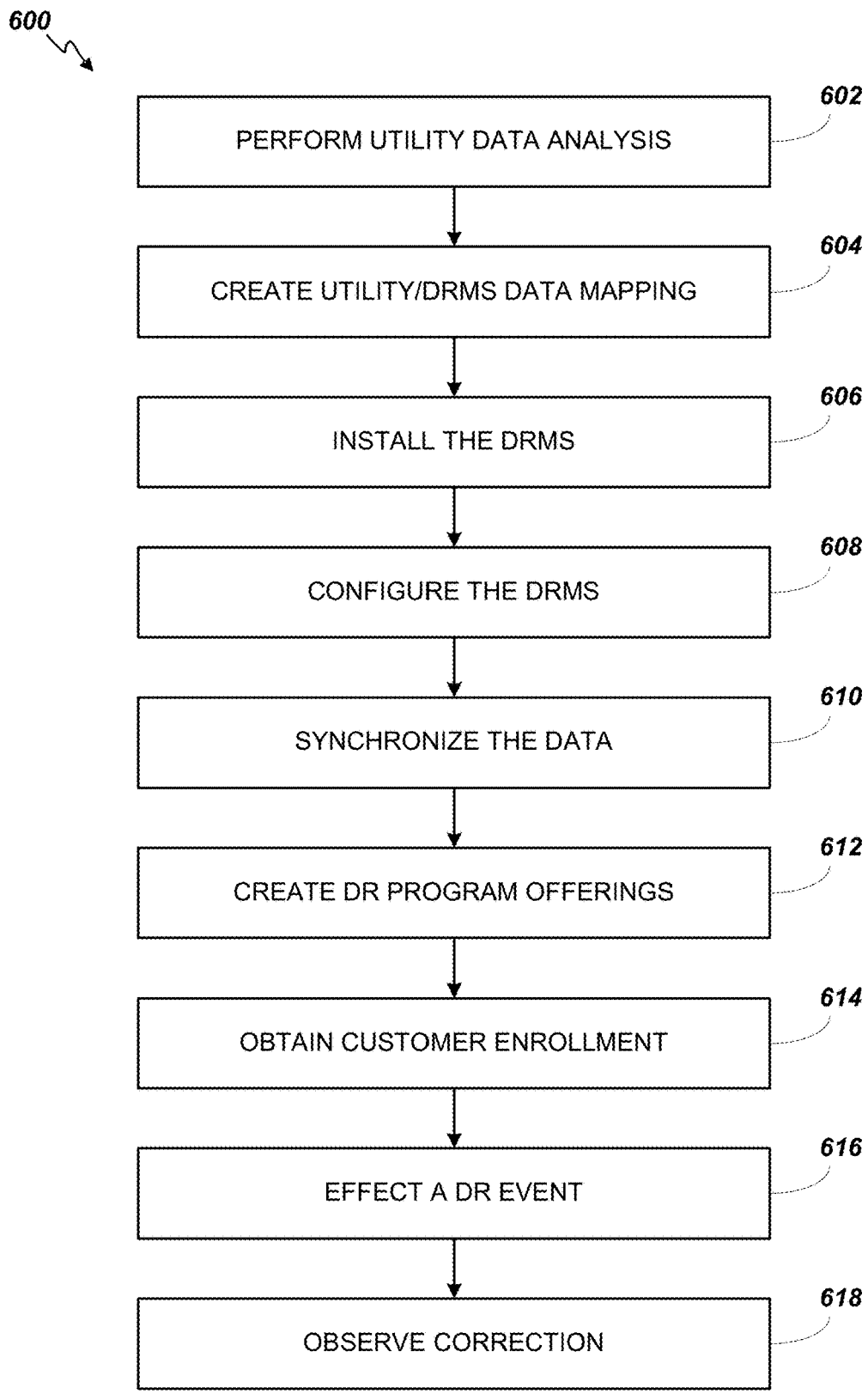
FIG. 6 is a flowchart depicting an example method of implementing and effecting a demand response (DR) event according to embodiments of the present invention.

FIG. 6 is a flowchart depicting an example method 600 of implementing and effecting a DR event. Initially, an analysis of utility data is performed to identify asset data that will be used, plus data that is potentially driving a need for a DR event (602). A utility/DRMS data mapping is then created to identify a location in the DRMS where utility data will reside, including potential custom fields (604). The DRMS is installed (606) and configured (608) including specifying all custom fields that will be used. In a data synchronization process, tools for synchronizing utility data into the DRMS database, including the content of custom fields, are deployed and configured (610). Next, DR program offerings are created (612) and customer enrollments into the DR programs are obtained (614). Based on the DR programs, DR events are effected (616). Finally, the impact of each DR event is observed to verify the condition intended to be addressed by each DR event has been corrected (618).

Figure 7:
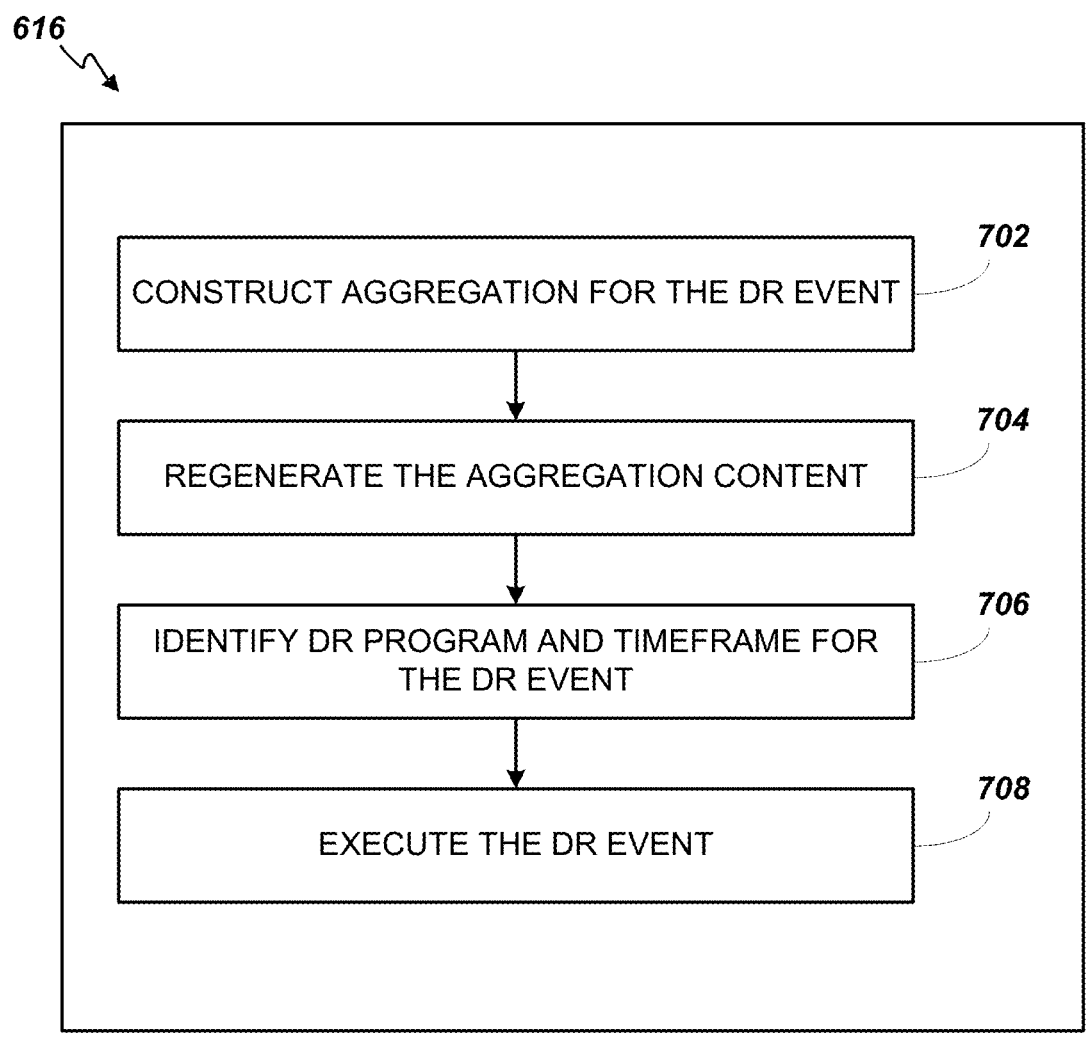
FIG. 7 is a flowchart depicting details of an example method of effecting a DR event according to embodiments of the present invention.

FIG. 7 is a flowchart depicting details of the process for effecting a DR event 616. Initially, an aggregation is constructed to satisfy the objectives of the particular DR event (702). In some embodiments, the DR event can have very precise objectives that "surgically" target very specific participant sites. In such cases, the use of one or more custom fields can be leveraged within one or more inclusion rules to very precisely define the aggregation. Next, the aggregation content is regenerated (704) and the DR program and timeframe for the DR event is identified (706). The DR event is then executed against the constructed aggregation, based on the identified DR program over the specified timeframe, in order to, for example shed load or time shift consumption (708).

The present disclosure is neither a literal description of all embodiments nor a listing of features of the invention that must be present in all embodiments.

The Title (set forth at the beginning of the first page of this disclosure) is not to be taken as limiting in any way as the scope of the disclosed invention(s).

The term "product" means any machine, manufacture and/or composition of matter as contemplated by 35 U.S.C. § 101, unless expressly specified otherwise.

Each process (whether called a method, class behavior, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display.

The present disclosure may refer to a "control system", application, or program. A control system, application, or program, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or non-transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases and/or data structures are described, it will be understood by one of ordinary skill in the art that (i) alternative database structures to those described may be readily employed, and (ii) other memory structures besides databases may be readily employed. Any illustrations or descriptions of any sample databases/data structure presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" generally refers to an energy delivery network. However, in some embodiments, an information or computing network can be used that provides an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

The foregoing description discloses only exemplary embodiments of the invention. Modifications of the above disclosed apparatus and methods which fall within the scope of the invention will be readily apparent to those of ordinary skill in the art. For example, although the examples discussed above are illustrated for an electricity market, embodiments of the invention can be implemented for other markets.

Accordingly, while the present invention has been disclosed in connection with exemplary embodiments thereof, it should be understood that other embodiments may fall within the spirit and scope of the invention, as defined by the following claims.

What is claimed is:

1. A method of effecting a demand response (DR) event with reduced requirement for distribution of data model updates, comprising:
    providing a demand response management system (DRMS) communicatively coupled to a plurality of participant sites, the DRMS including an extensible aggregation engine, the extensible aggregation engine having a memory with a data model stored in a first portion of the memory, a data structure stored in the memory, the data structure including a custom field stored in a second portion of the memory that is outside the data model's first portion of the memory and linked to the data model stored in the first portion of the memory, and a first rules-based function operative to dynamically assemble an aggregation of the plurality of participant sites for a DR event using inclusion criteria obtained from the custom field;
    populating the custom field via the link between the custom field in the second portion of the memory and the data model in the first portion of the memory;
    wherein the plurality of participant sites are represented by business objects storing core characteristics of the plurality of participant sites in a first plurality of core fields,
    wherein the business objects further store core characteristics of other related entities in a second plurality of core fields, and
    wherein the custom field is associated with a business object, and has a definition,
    wherein the extensible aggregation engine further includes a second rules-based function operative to assemble the aggregation of the plurality of participant sites for the DR event using inclusion criteria obtained from at least one core field of the first plurality of core fields;
    generating the aggregation of the plurality of participant sites for the DR event using the first rules-based function and the second rules-based function, which use the inclusion criteria obtained from the custom field and the inclusion criteria obtained from the at least one core field, respectively; and executing the DR event based on the aggregation of the plurality of participant sites.

2. The method of claim 1, further comprising regenerating the aggregation of the plurality of participant sites for the DR event.

3. The method of claim 1, wherein the extensible aggregation engine further includes a geographic function, and further comprising:

using the geographic function to generate the aggregation of the plurality of participant sites using inclusion criteria that includes location information, in conjunction with the first rules-based function.

4. The method of claim 1, wherein the extensible aggregation engine further includes an explicit function, and further comprising:

using the explicit function to generate the aggregation of the plurality of participant sites using an explicit list of selected participant sites, in conjunction with the first rules-based function.

5. The method of claim 1 wherein the DRMS further includes a program management module (PMM), and further comprising:

using the PMM to define a DR program with an associated DR event.

6. The method of claim 5, wherein executing the DR event includes executing the DR event based on the DR program and an associated timeframe.

7. A demand response management system (DRMS) with reduced requirement for distribution of data model updates, comprising:

a process controller;

a memory coupled to the process controller and having instructions stored therein executable by the process controller to cause the process controller to:

generate an aggregation of one or more participant sites for a demand response (DR) event using an extensible aggregation engine having a data model stored in a first portion of the memory, a data structure stored in the memory, the data structure including a custom field stored in a second portion of the memory that is outside the data model's first portion of the memory and linked to the data model stored in the first portion of the memory, and a first rules-based function operative to dynamically assemble one or more aggregations of one or more participant sites using inclusion criteria obtained from the custom field;

populate the custom field via the link between the custom field in the second portion of the memory and the data model in the first portion of the memory;

wherein one or more business objects are configured to represent the one or more participant sites and other related entities, and the one or more business objects have stored therein core characteristics of the one or more participant sites and the other related entities in a plurality of core fields, wherein at least one custom field is associated with at least one business object, and a definition and content of the at least one custom field is stored external to the associated at least one business object, wherein the extensible aggregation engine further includes a second rules-based function operative to assemble the one or more aggregations of the one or more participant sites for the DR event using inclusion criteria obtained from at least one core field of the plurality of core fields, and wherein the generation of the aggregation of the one or more participant sites for the DR comprises generation of the aggregation of the one or more participant sites for the DR using the first rules-based function and the second rules-based function, which use the inclusion criteria obtained from the custom field and the inclusion criteria obtained from the at least one core field, respectively; and execute the DR event based on the one or more aggregations of one or more participant sites to shed or shift a load.

8. The demand response management system of claim 7, further comprising instructions to cause the process controller to:

regenerate the aggregation of one or more participant sites for the DR event.

9. The demand response management system of claim 7, further comprising instructions to cause the process controller to:

execute a geographic function in the extensible aggregation engine to generate the aggregation of one or more participant sites using inclusion criteria that includes location information, in conjunction with the first rules-based function.

10. The demand response management system of claim 7, further comprising instructions to cause the process controller to:

execute an explicit function within the extensible aggregation engine to generate the aggregation of one or more participant sites using an explicit list of selected participant sites, in conjunction with the first rules-based function.

11. The demand response management system of claim 7, further comprising instructions to cause the process controller to:

define a DR program using a program management module (PMM) within the DRMS, wherein the DR program is usable for a DR event.

12. The demand response management system of claim 11, further comprising instructions to cause the process controller to:

execute the DR event based on the DR program and an associated timeframe.

13. A computer implemented demand response management system (DRMS) with reduced requirement for distribution of data model updates, comprising:

a computer-readable medium having instructions stored thereon that, when executed by a computer, cause the computer to:

dynamically assemble an aggregation of one or more participant sites for a demand response (DR) event using an extensible aggregation engine having a data model stored in a first portion of a memory of the extensible aggregation engine, and a data structure stored in the memory, the data structure including a custom field stored in a second portion of the memory that is outside the first portion of the memory and linked to the data model stored in the first portion of the memory, a first rules-based function operative to dynamically assemble an aggregation of the one or more participant sites for the DR event using inclusion criteria obtained from a custom field, and a second rules-based function operative to assemble the aggregation of the one or more participant sites for the DR event using inclusion criteria obtained from a core field of a plurality of core fields, wherein business objects are used to represent the participant sites and other related entities, the custom field being populated via the link between the custom field and the data model;

wherein a definition and content of the custom field is stored external to an associated business object;

store core characteristics of the participant sites and the other related entities in the plurality of core fields, and associate the custom field with a business object;

wherein the generation of the aggregation of the one or more participant sites for the DR comprises generation of the aggregation of the one or more participant sites for the DR using the first rules-based function and the second rules-based function, which use the inclusion criteria obtained from the custom field and the inclusion criteria obtained from the core field, respectively; and execute the DR event based on the aggregation of one or more participant sites by sending a control signal to each one of the one or more participant sites included in the aggregation of one or more participant sites.

14. The computer implemented DRMS of claim 13, wherein the computer-readable medium having instructions stored thereon that, when executed by the computer, further cause the computer to:
generate the aggregation of one or more participant sites using inclusion criteria that includes location information, in conjunction with a first rules-based function.

15. The computer implemented DRMS of claim 13, wherein the computer-readable medium having instructions stored thereon that, when executed by the computer, further cause the computer to:
generate the aggregation of one or more participant sites using an explicit list of selected participant sites, in conjunction with a first rules-based function.

16. The computer implemented DRMS of claim 13, wherein the computer-readable medium further includes instructions that, when executed by the computer, further cause the computer to manage DR programs that can be associated with DR events.

17. The computer implemented DRMS of claim 13, wherein the computer is communicatively coupled to one or more end devices at each participant site of the aggregation of one or more participant sites.

\* \* \* \* \*